March 4, 1952
E. O. BOX, JR
2,587,689
SEPARATION OF ACETYLENE FROM
GASEOUS HYDROCARBON MIXTURES
Filed March 31, 1947
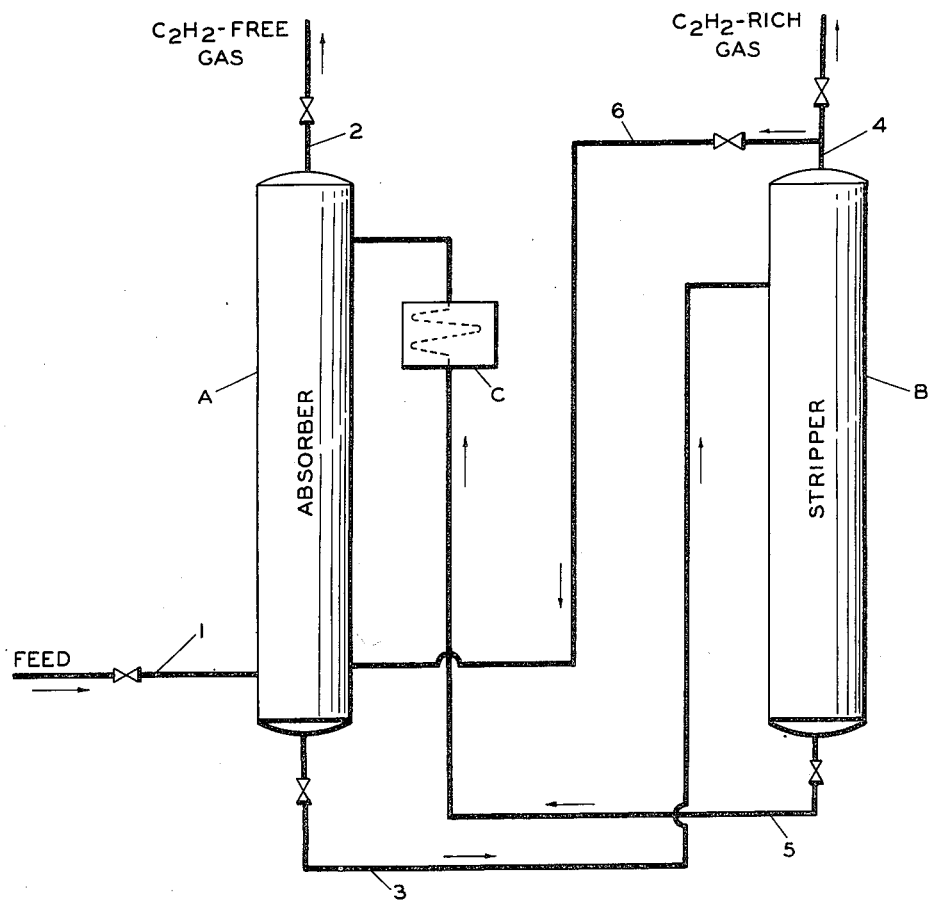
INVENTOR.
E.O. BOX, JR.
BY Hudson and Young
Attorneys Patented Mar. 4, 1952

2,587,689

UNITED STATES PATENT OFFICE 2,587,689

SEPARATION OF ACETYLENE FROM GAS-
EOUS HYDROCARBON MIXTURES

E. O. Box, Jr., Bartlesville, Okla., assignor to
Phillips Petroleum Company, a corporation of
Delaware Application March 31, 1947, Serial No. 738,382

7 Claims. (Cl. 183—115)

This invention relates to the separation of acetylene from normally gaseous hydrocarbon mixtures by the use of a suitable selective solvent. It is particularly applicable to the separation of acetylene from admixture with ethylene or ethane or both. It may be very advantageously applied to the separation of acetylene from olefin-paraffin-hydrogen mixtures rich in ethylene.

The principal object of the present invention is to provide an improved method of separating acetylene from normally gaseous hydrocarbon mixtures containing the same. Another object is to provide an improved process for effecting separation and recovery in concentrated form of acetylene from such mixtures. Another object is to provide an improved selective solvent for separation or recovery of acetylene from normally gaseous hydrocarbon mixtures containing the same. Another object is to provide an improved process for separating acetylene from admixture with more saturated $C_2$ hydrocarbons, specifically ethylene or ethane or both. Another object is to provide an improved method of separating acetylene from olefin-paraffin-hydrogen mixtures rich in ethylene. Many other objects of the present invention will more fully hereinafter appear.

The accompanying drawing portrays diagrammatically one arrangement of equipment which is very suitable for practicing the present invention.

In its broader aspects, my invention is a method of separating acetylene from gaseous hydrocarbon mixtures containing the same together with at least one more saturated hydrocarbon which involves scrubbing the hydrocarbon mixture in the gaseous state with liquid acetic anhydride and thereby effecting preferential dissolution of acetylene contained in the mixture in the acetic anhydride employed as a selective solvent while allowing the more saturated hydrocarbon to remain undissolved.

The process of my invention may comprise the following steps. The gaseous hydrocarbon mixture which contains acetylene together with more saturated hydrocarbon is first contacted intimately with liquid acetic anhydride in an absorption zone under such conditions of temperature and pressure that a substantial quantity of the acetylene is preferentially dissolved in the acetic anhydride used as a solvent. The acetylene-rich acetic anhydride is withdrawn from the absorption zone and passed to a stripping zone wherein the acetic anhydride is stripped of dissolved gases which are considerably richer in acetylene than the original feed. This stripping may be accomplished in known manner by reduction of pressure or application of heat or by both. The hydrocarbon-lean acetic anhydride withdrawn from the stripping zone is suitable for returning to the absorption zone and re-use in contacting fresh gas feed, thus making possible a continuous process. Gases taken overhead from the stripper are enriched with respect to the acetylene, whereas gases taken overhead from the absorption zone are depleted with respect to acetylene and generally are substantially free of acetylene.

Any suitable method of contacting the gases containing acetylene with the acetic anhydride may be employed. The preferred procedure is to contact countercurrently the gaseous hydrocarbon mixture with the liquid acetic anhydride in a vertical tower provided with bubble plates or other contact elements such as packing, baffle plates, etc. It is preferred to operate the absorption zone at atmospheric or superatmospheric pressure and at temperatures ranging from —10° F. to 90° F. The pressure may range from atmospheric upwardly to any suitable superatmospheric pressure. The conditions of absorption should be such however that the hydrocarbon mixture being treated remains in the gaseous phase. Ordinarily this requirement will not limit the pressure employed because the scrubbing operation will usually be conducted at a temperature above the critical temperature of the gases being treated. Should an absorbing temperature below the critical temperature of the hydrocarbon mixture undergoing treatment or remaining undissolved in the absorbtion operation be employed, the pressure at which the absorber is operated must be below the vapor pressure in order to maintain gaseous phase conditions.

The stripping zone may be operated under any conditions of pressure and temperature which will effect liberation of the dissolved acetylene-rich hydrocarbon from the acetic anhydride solvent. It is preferred to operate the stripping zone at a pressure slightly below atmospheric and at a temperature of from 120 to 180° F.

Suitable temperatures and pressures for the absorbing and stripping steps cover a much wider range than those given above, dependent upon the degree of the recovery of acetic anhydride desired. Obviously it is desired to keep the vaporization of acetic anhydride and consequent appearance thereof in the overhead gas streams leaving the absorber and stripper at a minimum. However suitable provision may be made for recovering any vaporized acetic anhydride from such gaseous overhead streams.

I have found that it is highly desirable to return a portion of the stripper overhead to the bottom of the absorber. This recycled material may be introduced into the extreme bottom of the stripper or at a point a short distance above the bottom of the absorber. This recycled material may be termed reflux and it serves to increase the degree of seperation effected. The recycled material displaces from the rich solvent leaving the bottom of the absorber any dissolved more saturated hydrocarbon and thereby enhances greatly the effectiveness of the seperation. Thus if the solvent dissolves some ethylene or ethane or both in addition to acetylene, the introduction of reflux in the manner just described effects displacement of such dissolved ethylene or ethane from the rich solvent attaining the bottom of the absorber and results in a much better separation as between acetylene and the more saturated hydrocarbon.

I have discovered that acetic anhydride shows a considerable selectivity as regards its power for dissolving gaseous hydrocarbons, thus making it suitable as a selective solvent for removing acetylene from gaseous hydrocarbon mixtures containing the same. The solvent employed in accordance with my invention preferably consists of liquid acetic anhydride.

In general, I have discovered that acetylene is more soluble in acetic anhydride than either olefins or paraffins of comparable molecular weight. For example, acetylene is more soluble than ethylene in acetic anhydride, and ethylene is more soluble than ethane in this solvent. The mixture to which the process of the present invention may be applied may comprise acetylene, olefins, paraffins and hydrogen. The olefins may be mainly ethylene, with or without higher olefins such as propylene and butylenes. The paraffins may be ethane or may be higher or lower, for example methane, propane or butanes. The process of my invention may be employed to separate acetylene from ethylene or from ethane or from both ethylene and ethane. If hydrogen is present in the gaseous feed, it is rejected by the solvent and appears with the more saturated hydrocarbons than acetylene in the residue gas leaving the absorber. The invention may conveniently be employed to effect the recovery or concentration or both of acetylene from a gaseous hydrocarbon mixture prepared by dehydrogenation or pyrolysis of any suitable hydrocarbon feed under such conditions as to yield acetylene. An example is the effluent from a process for conversion of ethane or ethylene to acetylene by catalytic or pyrolytic dehydrogenation. An example is the effluent from an acetylene manufacturing process such as is disclosed in the copending application of S. P. Robinson, Serial No. 671,983 filed May 24, 1946, now Patent No. 2,482,438, granted Sept. 20, 1949.

In the accompanying drawing the gas feed mixture is fed to absorption tower A through line 1. This tower may be operated at atmospheric or super-atmospheric pressure for example at 70° F. and is provided with means for promoting intimate contact between solvent and gas, such as bubble plates, packing, etc. The gas mixture is contacted countercurrently with acetic anhydride in tower A. It is known that acetic anhydride can be decomposed readily to acetic acid with water (Organic Chemistry by Fieser and Fieser, D. C. Heath and Company, 1944, page 193). Therefore, care should be exercised to remove any water that is present in the incoming gases. A gas substantially free of acetylene is withdrawn from the top of tower A through line 2. Acetylene-rich acetic anhydride is withdrawn from the bottom of tower A through line 3. This liquid is fed to the stripping tower B which may be maintained at slightly less than atmospheric pressure and at 175° F. for example. Heating may be accomplished by a heating coil, not shown, in the kettle. Acetylene-rich gas is withdrawn at the top of stripper B through line 4. A portion of this gas may be fed via line 6 back to the absorption zone A. This returned gas may be introduced at or near the bottom of tower A. Such recycling will increase the purity of the recovered acetylene. Acetylene-lean acetic anhydride is fed via line 5 back to the absorption zone A after cooling in coil C to an appropriate temperature.

The solvent is introduced into the top of absorber A and the feed is usually introduced into the bottom thereof. Where reflux is employed by means of line 6, the point of entry of the feed may be substantially above the bottom of the column A.

In order to recover the small amount of acetic anhydride carried over as vapor in the overhead from stripper column B, line 4 may feed into a cooling zone (not shown) where more acetic anhydride is condensed. Such condensed acetic anhydride may then be returned to the stripping zone B. A similar expedient may be practiced in the case of the residue gas leaving the top of absorber A via line 2. Acetic anhydride in the streams 2 and 4 may also be recovered by contacting these streams with a suitable adsorbent such as charcoal, activated carbon, silica gel, etc. or with a suitable absorbent such as mineral oil, for example, so-called mineral seal oil or other absorber oil, furfural and the like. The gases in lines 2 and 4 may also be freed from acetic anhydride by water washing. It will be understood that suitable pumps will be employed to control efficiently the transmission of the liquid from one station to another and that a complete commercial system would include numerous details not shown in the drawing.

It is to be understood that the present invention is applicable to processing a gaseous hydrocarbon stream for the purpose of removal of acetylene from said stream or for concentrating acetylene from said stream. By suitable design, both of these objectives may be accomplished simultaneously. Each of these applications is included in the broad concept of the present invention.

To further illustrate this invention the following specific examples are given.

*Example I*

Pure acetylene gas was contacted with acetic anhydride until equilibrium was established at atmospheric pressure and 75° F. Under these conditions 11.0 cc. of acetic anhydride dissolved 94.5 cc. of acetylene (calculated at NTP). Under the same conditions 11.0 cc. of acetic anhydride dissolved only 13.5 cc. (calculated at NTP) of ethylene. Similarly only 10.1 cc. of ethane were absorbed.

*Example II*

A 250 cc. sample of gas containing 7.37 per cent acetylene, 92.67 per cent of ethylene was contacted with 30 cc. of acetic anhydride by vigorous shaking at atmospheric pressure at 75° F. until equilibrium was established. Under these conditions the gas phase at equilibrium contained 3.2 per cent acetylene and 96.8 per cent ethylene.

*Example III*

A 250 cc. sample containing a mixture of 0.74 per cent acetylene and 99.26 per cent ethane was contacted with 30 cc. of acetic anhydride at atmospheric pressure and 75° F. until equilibrium was established. Under these conditions the gas phase at equilibrium contained 0.19 per cent acetylene and 99.81 per cent ethane. Similarly a mixture originally containing 0.43 per cent acetylene was reduced to a concentration of 0.12 per cent acetylene.

From the foregoing many advantages of the process of the present invention will be apparent to those skilled in the art. The principal advantage is that a simple and economical method is provided whereby acetylene can be recovered from gaseous hydrocarbon mixtures containing the same, even when the proportion of actylene in such stream is small as is often the case. Another advantage is that acetic anhydride exhibits high selectivity for acetylene in preference to more saturated hydrocarbons for example ethylene or ethane. This is highly advantageous because it makes possible the employment of a low rate of circulation of the acetic anhydride through the system and the use of compact equipment. Numerous other advantages of my invention will be obvious to those skilled in the art.

I claim:

1. The process of separating acetylene from a gaseous hydrocarbon mixture containing the same together with at least one more saturated hydrocarbon which comprises scrubbing said mixture in the gaseous state in the absence of water with liquid acetic anhydride and thereby effecting preferential dissolution of acetylene contained in the mixture in the acetic anhydride while allowing more saturated hydrocarbon to remain undissolved, and separating the resulting acetylene-enriched acetic anhydride from the undissolved gas.

2. The process of separating acetylene from a gaseous hydrocarbon mixture containing the same together with at least one more saturated aliphatic $C_2$ hydrocarbon which comprises scrubbing said mixture in the gaseous state in the absence of water with liquid acetic anhydride and thereby effecting preferential dissolution of acetylene contained in the mixture in the acetic anhydride while allowing the more saturated aliphatic $C_2$ hydrocarbon to remain undissolved, and separating the resulting acetylene-enriched acetic anhydride from the undissolved gas.

3. The process of separating acetylene from a gaseous hydrocarbon mixture containing same together with ethylene which comprises scrubbing said mixture in the gaseous state in the absence of water with liquid acetic anhydride and thereby effecting preferential dissolution of acetylene contained in the mixture in the acetic anhydride while allowing the ethylene to remain undissolved, and separating the resulting acetylene-enriched acetic anhydride from the undissolved gas.

4. The process of separating acetylene from a gaseous hydrocarbon mixture containing same together with ethane which comprises scrubbing said mixture in the gaseous state in the absence of water with liquid acetic anhydride and thereby effecting preferential dissolution of acetylene contained in the mixture in the acetic anhydride while allowing the ethane to remain undissolved, and separating the resulting acetylene-enriched acetic anhydride from the undissolved gas.

5. The process of claim 1 wherein said scrubbing is conducted at a temperature of from −10 to 90° F. and at a pressure of at least atmospheric.

6. The process of separating acetylene from a gaseous hydrocarbon mixture containing same together with at least one more saturated hydrocarbon which comprises scrubbing said mixture in the gaseous state in the absence of water at a temperature of from −10 to 90° F. and at at least atmospheric pressure with liquid acetic anhydride and thereby effecting preferential dissolution of acetylene contained in the mixture in the acetic anhydride while allowing the more saturated hydrocarbon to remain undissolved, withdrawing the acetylene-enriched acetic anhydride from the scrubbing zone, and stripping said enriched acetic anhydride at a temperature of from 120 to 180° F. and at a pressure slightly below atmospheric to recover acetylene-rich hydrocarbon therefrom.

7. The process of separating acetylene from a gaseous hydrocarbon mixture containing same together with at least one more saturated hydrocarbon which comprises intimately countercurrently contacting said mixture in the gaseous state in the absence of water with liquid acetic anhydride and thereby effecting preferential dissolution of acetylene contained in the mixture in the acetic anhydride while allowing the more saturated hydrocarbon to remain undissolved, withdrawing the undissolved gas thereby depleted in acetylene from the top of the contacting zone, withdrawing the resulting acetylene-enriched acetic anhydride from the bottom of the contacting zone, passing said enriched acetic anhydride to a separate stripping step and there stripping the dissolved acetylene from the acetic anhydride.

E. O. BOX, Jr.

REFERENCES CITED

The following references are of record in the file of this patent:

UNITED STATES PATENTS

| Number | Name | Date |
|---|---|---|
| 1,965,100 | Groll et al. | July 3, 1934 |
| 2,217,429 | Balcar | Oct. 8, 1940 |
| 2,371,908 | Morris | Mar. 20, 1945 |
| 2,377,049 | Souders, Jr. | May 29, 1945 |

OTHER REFERENCES

Annales De Chemie et de Physique, Series 4, vol. 9, page 425.

Gazzetta Chemica Italiana, vol. 34, bk. II, pages 11 and 12.

Textbook of Organic Chemistry, Wertheim, Blakiston Co., Philadelphia, page 182.